(12) United States Patent
Nishioka et al.

(10) Patent No.: US 9,075,204 B2
(45) Date of Patent: Jul. 7, 2015

(54) OPTICAL CONNECTOR CONSTRUCTION TOOL

(75) Inventors: Daizo Nishioka, Yokohama (JP);
Yukihiro Yokomachi, Yokohama (JP);
Yoshinobu Toda, Yokohama (JP);
Yoshio Ukita, Komaki (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1009 days.

(21) Appl. No.: 13/055,906

(22) PCT Filed: Aug. 3, 2009

(86) PCT No.: PCT/JP2009/063721
§ 371 (c)(1),
(2), (4) Date: Jan. 25, 2011

(87) PCT Pub. No.: WO2010/016451
PCT Pub. Date: Feb. 11, 2010

(65) Prior Publication Data
US 2011/0119904 A1    May 26, 2011

(30) Foreign Application Priority Data
Aug. 4, 2008   (JP) .................... 2008-200597

(51) Int. Cl.
*B23P 19/04* (2006.01)
*G02B 6/38* (2006.01)
(Continued)

(52) U.S. Cl.
CPC .............. *G02B 6/3846* (2013.01); *Y10T 29/53* (2015.01); *B25B 27/06* (2013.01); *B23P 19/02* (2013.01); *B23P 11/005* (2013.01); *B25B 27/02* (2013.01); *G02B 6/3802* (2013.01); *G02B 6/3898* (2013.01)

(58) Field of Classification Search
USPC .......................................... 29/244
See application file for complete search history.

(56) References Cited

U.S. PATENT DOCUMENTS 5,481,640 A * 1/1996 Harman et al. ............... 385/147
6,505,975 B2 * 1/2003 Asada et al. .................... 385/72
(Continued)

FOREIGN PATENT DOCUMENTS

| CN | 101034192 A | 9/2007 |
| JP | 2004-381591 A | 12/2004 |

(Continued)

OTHER PUBLICATIONS

Chinese Office Action of the corresponding Chinese Application No. 200980128071.7, dated Oct. 31, 2012.
(Continued)

*Primary Examiner* — Lee D Wilson
*Assistant Examiner* — Alvin Grant
(74) *Attorney, Agent, or Firm* — Global IP Counselors, LLP (57) ABSTRACT

There is provided an optical connector construction tool, which is constructed as a single component, and is compact in size and simple, wherein the construction tool allows an operation of withdrawing a wedge to be more reliably performed, and a manufacturing costs to be reduced. The optical connector construction tool comprises a base plate, a wedge provided to a bottom surface of the base plate and inserted into a mechanical splice part of an optical connector, a pair of arms extending from both sides of the base plate, and protrusions projecting from the arms toward the base plate, the protrusions engaging with the bottom of the base plate and deflecting the base plate upward as a result of the arms being laterally brought together.

10 Claims, 8 Drawing Sheets

(51) Int. Cl.
  *B25B 27/06* (2006.01)
  *B23P 19/02* (2006.01)
  *B23P 11/00* (2006.01)
  *B25B 27/02* (2006.01)

(56) References Cited

U.S. PATENT DOCUMENTS

| | | | |
|---|---|---|---|
| 7,346,255 B2* | 3/2008 | Yamaguchi et al. | 385/136 |
| 7,720,345 B2* | 5/2010 | Katagiyama et al. | 385/137 |
| 7,934,874 B2* | 5/2011 | Honma et al. | 385/97 |
| 2002/0114583 A1* | 8/2002 | Asada et al. | 385/78 |
| 2006/0104590 A1 | 5/2006 | Yamaguchi et al. | |
| 2007/0211997 A1 | 9/2007 | Saito et al. | |
| 2009/0238523 A1* | 9/2009 | Honma et al. | 385/96 |

FOREIGN PATENT DOCUMENTS

| | | |
|---|---|---|
| JP | 2004361591 A | 12/2004 |
| JP | 2005-292429 A | 10/2005 |
| JP | 2006-139212 A | 6/2006 |
| JP | 2006-184491 A | 7/2006 |
| JP | 2006-285149 A | 10/2006 |
| JP | 2006-323067 A | 11/2006 |
| JP | 2007-121794 A | 5/2007 |
| JP | 2007-121886 A | 5/2007 |
| JP | 2007-279514 A | 10/2007 |

OTHER PUBLICATIONS

Taiwanese Office Action of the corresponding Taiwanese Patent Application No. 098126221, dated Mar. 25, 2014.
Extended European Search Report of the counterpart European Patent Application No. 09 804 934.9, dated Nov. 13, 2014.

* cited by examiner

PRIOR ART

OPTICAL CONNECTOR CONSTRUCTION TOOL

BACKGROUND OF THE INVENTION

1. Technical Field

The present invention relates to a construction tool used for an optical connector in which a mechanical splice is employed.

2. Related Background Art

An optical connector provided at a distal end with a capillary incorporating a short optical fiber is cited in Japanese Laid-open Patent Publication No. 2007-121886 as an optical connector readily assembled on site. In this type of connector, a short optical fiber and an optical fiber to be assembled with a connector are connected (mechanically spliced) at the rear side of the capillary. The mechanical splicing is performed using a construction tool. A wedge of the construction tool is inserted inside a mechanical splicing part, the mechanical splicing part is placed in an opened state, a distal end of an unsheathed optical fiber is inserted from the proximal end into a V-shaped groove on the inside of the mechanical splicing part, and the optical fiber is connected to the short optical fiber. The wedge is then withdrawn, and the mechanical splicing part is placed in a closed state. The short optical fiber and the optical fiber to be assembled with a connector are thus capable of being coaxially anchored.

The construction tool cited in Japanese Laid-open Patent Publication No. 2007-121886 cannot be manufactured inexpensively because a minimum of two components; i.e., a wedge and a base for securing the wedge, are required. Furthermore, the fact that the construction tool is formed using a plurality of components presents problems in that visible light escaping from the mechanical splicing part is not readily transmitted even if a transparent material is used, and completion of the assembly cannot be readily confirmed by visual observation.

Figure 9:
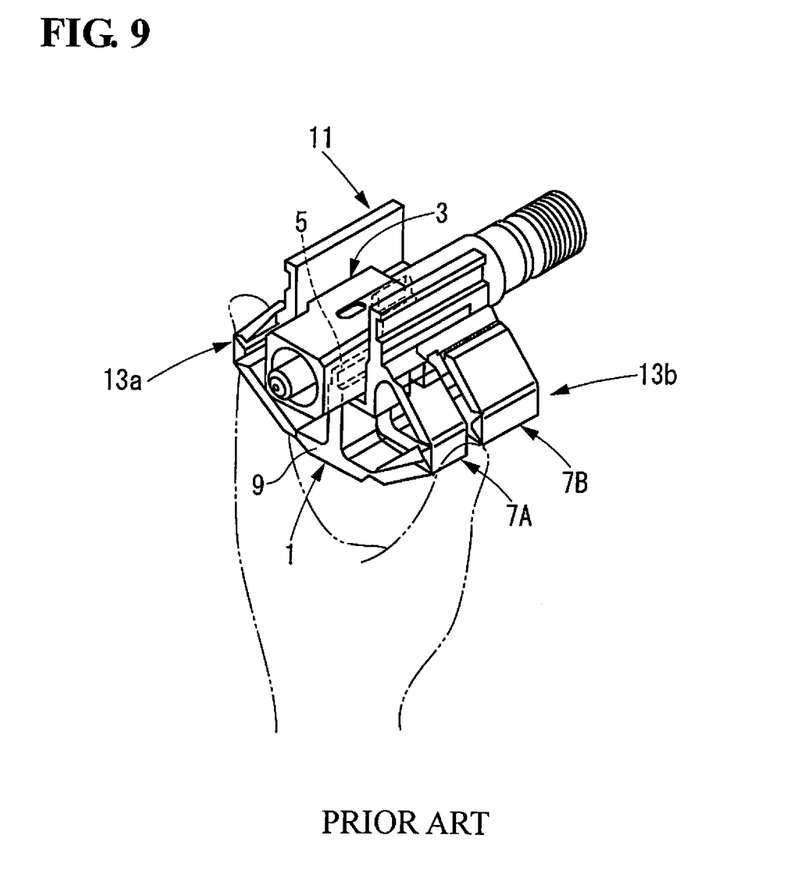
FIG. 9 is a conceptual view of an optical connector provided with a conventional implement.

FIG. 9 is a conceptual view of an optical connector cited in Japanese Laid-open Patent Publication No. 2006-139212, the connector being provided with a tool. For this optical connector provided with the tool, the tool 1 is attached to an optical connector 3. The tool 1 comprises a connector holder part 11, an interposing member 5 that is inserted between, and opens, elements of a clamp part of the optical connector 3, and separate drive parts 7A, 7B, and a moveable end part 9 for linking the connector holder part 11 and the interposing member 5. The separate drive parts 7A, 7B are pressed from both sides, and linking wall parts 13a, 13b on either side are brought into closer proximity to each other, whereby the interposing member 5 inserted between the elements is withdrawn from the space between the elements, and the connecting portion of the optical fiber and the short optical fiber can be anchored.

The optical connector implement disclosed in Japanese Laid-open Patent Publication No. 2006-139212 can only be obtained using flexible materials because the linking wall parts 13a, 13b must be deformed by lateral pressure despite being integrally constructed as a single component. Accordingly, a problem is presented in that wedge creep tends to occur, and the open state is not readily maintained despite the interposing member 5 having been inserted. In addition, the large amount of space required and material costs for the implement increase due to its large size; moreover, the fact that the implement is not recycled at the end of its service life leads to waste and ineffective use of resources. In addition, no means is provided for readily confirming that assembling has been successfully performed.

PRIOR ART CITATION

Patent Citation

Patent Citation 1: Japanese Laid-open Patent Publication No. 2007-121886

Patent Citation 2: Japanese Laid-open Patent Publication No. 2006-139212

DISCLOSURE OF THE INVENTION

Problems which the Invention is Intended to Solve

An object of the present invention is to provide an optical connector construction tool, which is constructed as a single component, compact in size, and simple such that the construction tool allows the reliable operation of wedge withdrawal, and reduces manufacturing costs.

Means Used to Solve the Above-Mentioned Problems

In order to solve the above problems, there is provided an optical connector construction tool comprising a base plate; a wedge provided to a bottom surface of the base plate, the wedge being inserted into a mechanical splicing part of an optical connector; a pair of arms extending from both side parts of the base plate, the arms having proximal ends for contacting both side parts; and a protrusion projecting from the arms toward the base plate, the protrusion engaging with the bottom surface of the base plate and deflecting the base plate upward as a result of the arms being laterally brought together.

In the optical connector construction tool according to the present invention, it is possible for the wedge to comprise a rear side wedge provided on the base plate in a vicinity of the proximal ends of the arms, and a front side wedge provided on the base plate forward of the vicinity of the proximal ends; the front wedge side of the base plate being deflected upward in advance of the base plate in the vicinity of the proximal end. In addition, in the optical connector construction tool according to the present invention, at least the wedge and the base plate may be formed from a transparent resin, in which case a top surface of the base plate is preferably formed in a convex lens shape in the portion of the base plate in which the wedge is positioned.

The optical connector construction tool according to the present invention may comprise a locking portion for keeping the pair of arms from getting close to each other. In addition, the optical connector construction tool according to the present invention may comprise, in the vicinity of the proximal ends, an upright bar for engaging with the optical connector, for positioning the optical connector construction tool on the optical connector, and for being a pivotally supporting portion around which the base plate deflects upward; and the vicinity of the proximal ends may be the pivotally supporting portion around which the base plate upwardly deflects when engaging with the optical connector occurs with the wedge interposed therebetween.

DETAILED DESCRIPTION OF THE INVENTION

An embodiment of the present invention will be described hereinafter with reference to the drawings. The drawings are provided for descriptive purposes only, and not by way of limitation to the invention. To avoid repetitive descriptions, the same sections are shown in the drawings using identical reference numerals. The scale in the drawings is not necessarily accurate.

Figure 7:
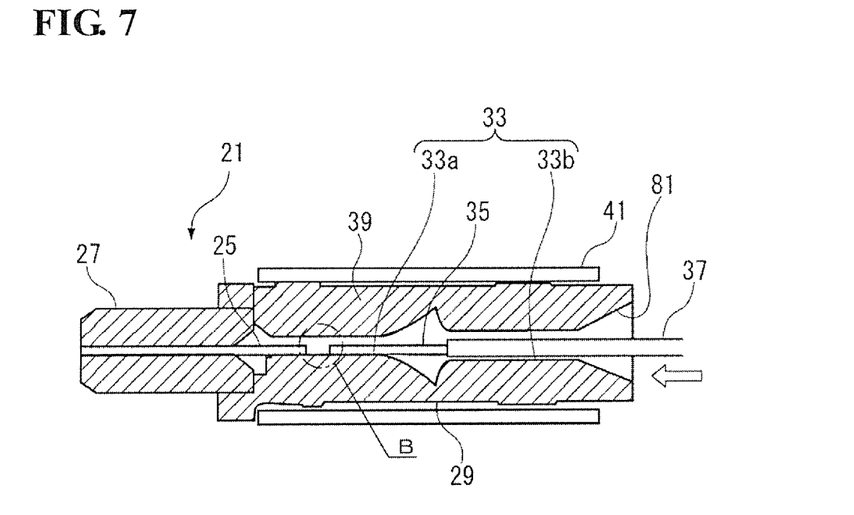
FIG. 7 is a cross-sectional view of the periphery of a mechanical splicing part in an optical connector being assembled using an optical connector construction tool according to the present invention, the view being shown with respect to a plane that includes an optical fiber and is perpendicular to the direction in which the wedge is withdrawn.

FIG. 7 is a cross-sectional view of the periphery of a mechanical splicing part in an optical connector 21 being assembled using an optical connector construction tool according to the present invention, the view being shown with respect to a plane that includes an optical fiber and is perpendicular to the direction in which the wedge is withdrawn. The optical connector 21 is a "mechanical splice"-type optical connector, comprising a capillary 27 incorporating a short optical fiber 25. One end of the short optical fiber 25 is a polished surface and is exposed on one end surface of the capillary 27, the other end protruding from the other end of the capillary 27. Hereinafter, the capillary 27 side of the optical connector 21 will be referred to as the "front," and the opposite side will be referred to as the "rear." The wedge insertion hole side (described below) of the optical connector 21 will be referred to as the "top," and the opposite side will be referred to as the "bottom." A V-grooved base plate 29 and a pressing lid 39 are provided to the rear of the capillary 27 and arranged next to each other.

Figure 4:
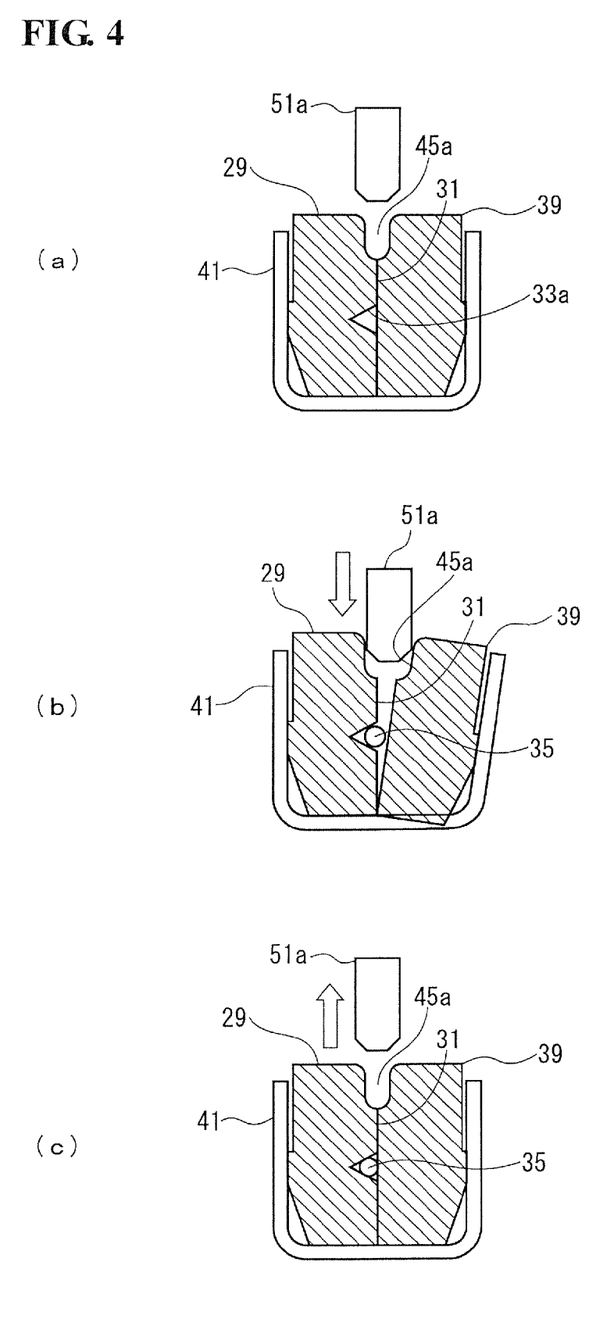
FIG. 4 is a cross-sectional view of a main part of an optical connector with respect to a plane perpendicular to an optical fiber, wherein (a) shows the state before a wedge is inserted, (b) shows the state during insertion of the wedge, and (c) shows the state after the wedge has been withdrawn.

A V-shaped groove 33 is formed coaxially with the short optical fiber 25 on the base plate surface 31 (a plane that includes the short optical fiber 25 and is perpendicular to the plane of paper of FIG. 7; refer to FIG. 4) of the V-grooved base plate 29. The V-shaped groove 33 comprises a front-side optical-fiber anchoring groove 33a for positioning and anchoring an unsheathed optical fiber (glass fiber) 35 to the short optical fiber 25; and a rear-side sheathed-fiber-anchoring groove 33b for anchoring the sheathed fiber 37 together with the sheath.

The V-grooved base plate 29 and the pressing lid 39 are clamped together by a clamp spring 41 having a U-shaped cross section in a state in which the pressing lid 39 is pressed into the base plate surface 31. In the optical fiber anchoring groove 33a, by affixing the pressing lid 39 tightly to the base plate surface 31, the inwardly disposed glass fiber 35 is clamped in cooperation with the pressing lid 39, positioned coaxially with the short optical fiber 25, and restricted in terms of its movement in the axial direction. In the sheathed-fiber anchoring groove 33b, by affixing the pressing lid 39 tightly to the base plate surface 31, the inwardly disposed fiber provided with a sheath 37 is clamped in cooperation with the pressing lid 39, and restricted in terms of its movement in the axial direction. A fiber-insertion guide part 81 is formed in the V-grooved base plate 29 and the rear part of the pressing lid 39.

Figure 8:
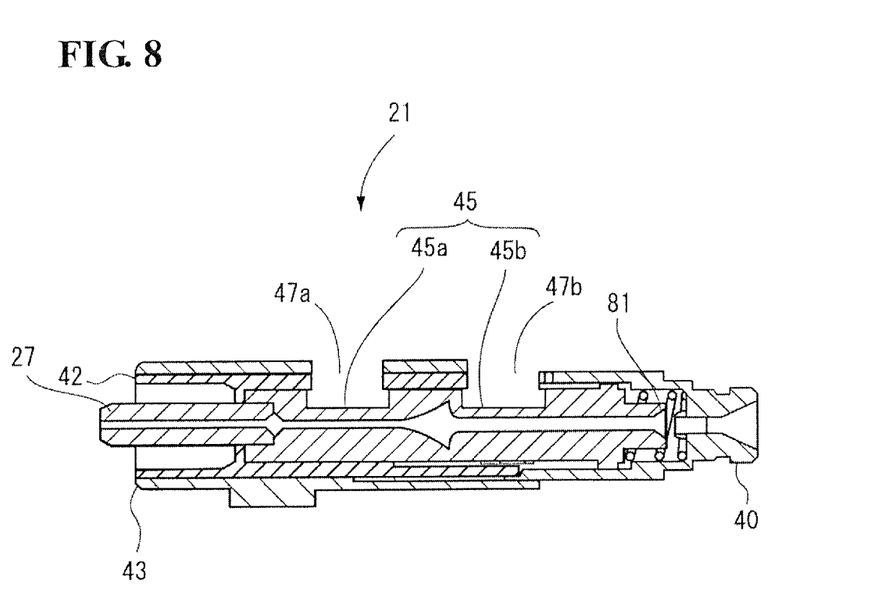
FIG. 8 is a cross-sectional view of the optical connector of FIG. 7, the view being shown with respect to a plane that includes an optical fiber and is parallel to the direction in which the wedge is withdrawn.

FIG. 8 is a cross-sectional view of the optical connector 21, the view being shown with respect to a plane that includes an optical fiber and is parallel to the direction in which the wedge is withdrawn. The V-grooved base plate 29 and pressing lid 39 clamped by the clamp spring 41 are held while covered by a rear housing 40 and a plug frame 42 disposed externally with respect to the pressing lid 39, and a handling case 43 disposed externally with respect to the exterior of the plug frame 42. The V-grooved base plate 29 and the pressing lid 39 are cut out on the open side of the clamp spring 41 such that a slit-shaped wedge insertion hole 45 is formed. The wedge insertion hole 45 comprises a front wedge insertion hole 45a in the vicinity of the optical-fiber anchoring groove 33a, and a rear wedge insertion hole 45b in the vicinity of the sheathed-fiber anchoring groove 33b. The front wedge insertion hole 45a and the rear wedge insertion hole 45b are exposed on the exterior of the optical connector 21 via slotted holes 47a, 47b provided to the handling case 43.

Figure 1:
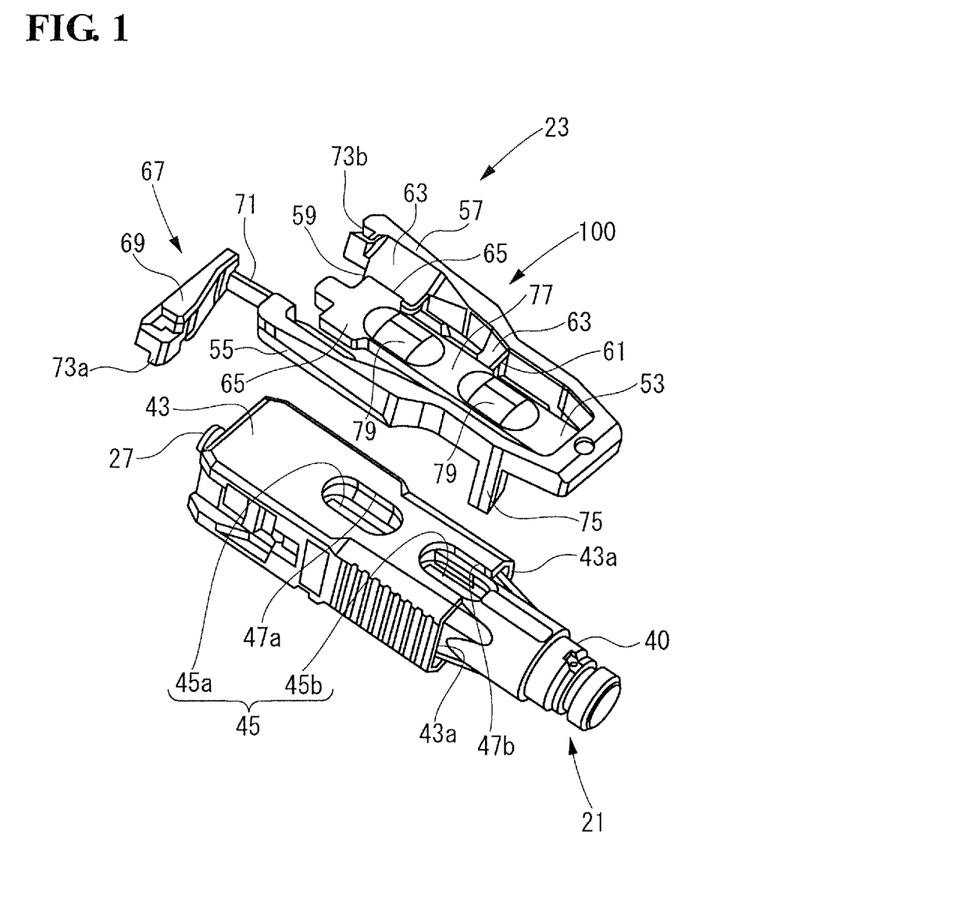
FIG. 1 is a perspective view showing an optical connector construction tool that is an embodiment according to the present invention arranged next to an optical connector in which a mechanical splice is employed.
Figure 2:
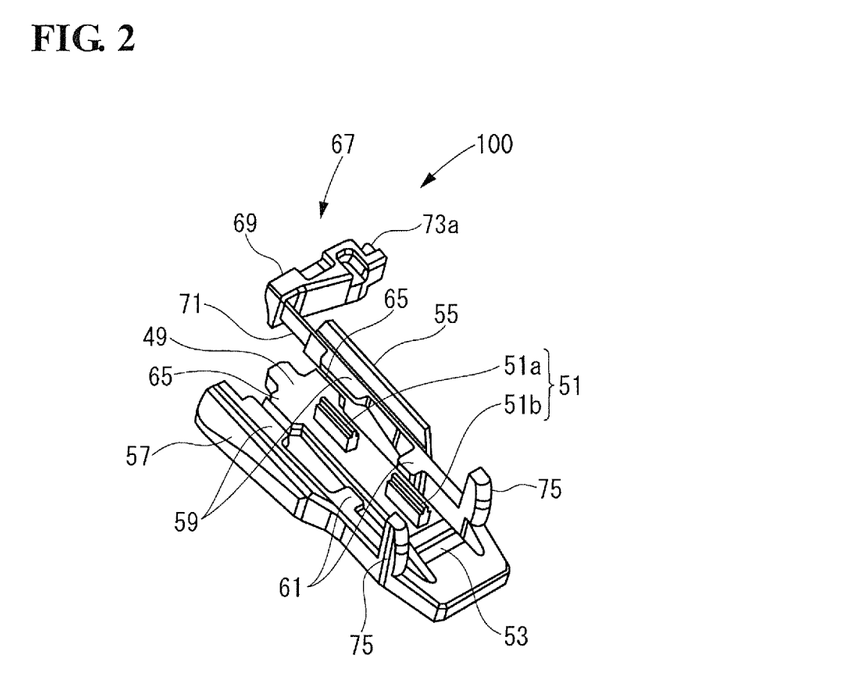
FIG. 2 is a perspective view of the optical connector construction tool of FIG. 1, as viewed from below.

FIG. 1 is a perspective view showing an optical connector construction tool 100 that is an embodiment according to the present invention arranged next to an optical connector 21 in which a mechanical splice is employed. FIG. 2 is a perspective view of the optical connector construction tool 100, as viewed from below. The optical connector construction tool 100 comprises a substantially rectangular wedge supporting plate (base plate) 53, and a pair of arms 55, 57 opening in a V-shape and extending from both sides on the rear part of the wedge supporting plate 53 toward the front part.

A wedge 51, which is a convex portion, is provided to a bottom surface 49 of the wedge supporting plate 53. The wedge 51 comprises a rear side wedge 51b provided on the wedge supporting plate 53 in the vicinity of proximal ends of arms 55, 57, and a front side wedge 51a provided forward of the proximal ends. The wedge 51a is inserted into the wedge insertion hole 45a, and the wedge 51b is inserted into the wedge insertion hole 45b (refer to FIG. 8).

A rear side protrusion 61 and a front side protrusion 59 project from the arms 55, 57 toward the wedge supporting plate 53. The arms 55, 57 are pressed together from the exterior, whereby the protrusions 59, 61 move toward the bottom surface 49 of the wedge supporting plate 53, and the wedge supporting plate 53 is caused to deflect upward. Inclined surfaces 63, 63 (refer to FIG. 5) sloping downward toward the wedge supporting plate 53 are preferably formed on an upper surface of the protrusions 59, 61 so that the wedge supporting plate 53 will be more readily deflected upward by the protrusions 59, 61.

The wedges 51a, 51b move upward by the upward deflecting of the wedge supporting plate 53. Shapes of the arms 55, 57 are such that when the arms 55, 57 are in a brought-together configuration, the front side protrusion 59 moves toward the bottom surface 49 of the wedge supporting plate 53 in advance of the rear side protrusion 61. The single action of bringing the pair of arms 55, 57 together causes the wedge to be withdrawn first from the front side wedge 51a and then from the rear side wedge 51b. The protrusions 59, 61 may engage with the wedge supporting plate 53 via, e.g., vanes 65, 65 provided to either side of the wedge supporting plate 53. Since the wedge insertion hole 45a is disposed in the vicinity of the optical-fiber anchoring groove 33a for connecting the short optical fiber 25 and the glass fiber 35, the short optical fiber 25 and the glass fiber 35 are first anchored and brought into a connected state, whereupon the fiber provided with a sheath 37 can be anchored. Anchoring can thereby be performed in an ideal sequence in which no stress remains inside the mechanical splice.

A locking portion 67 is provided to the front part of the pair of arms 55, 57, and is capable of restricting the distance between the arms 55, 57. In the locking portion 67, one end of a locking piece 69 is linked to a front end of the arm 55 via a hinge 71, whereby the rotating distal end reaches the other arm 57. In a normal state in which the construction tool is operated, the locking piece 69 faces the side opposite the arm 57. A locking concave portion 73b and a locking protrusion 73a, which constitute locking means 73, are formed on the rotating distal end of the locking piece 69 and the front part of the arm 57; and the pivoting distal end of the locking piece 69 is capable of being anchored to the arm 57.

The pair of arms 55, 57 are locked by the locking portion 67 so as to be prevented from coming close to one another, whereby the wedge supporting plate 53 will not deflect upward. Even when the arms 55, 57 are subjected to lateral pressure, it is possible to prevent the wedge from being unintentionally withdrawn from the optical connector 21.

Figure 3:
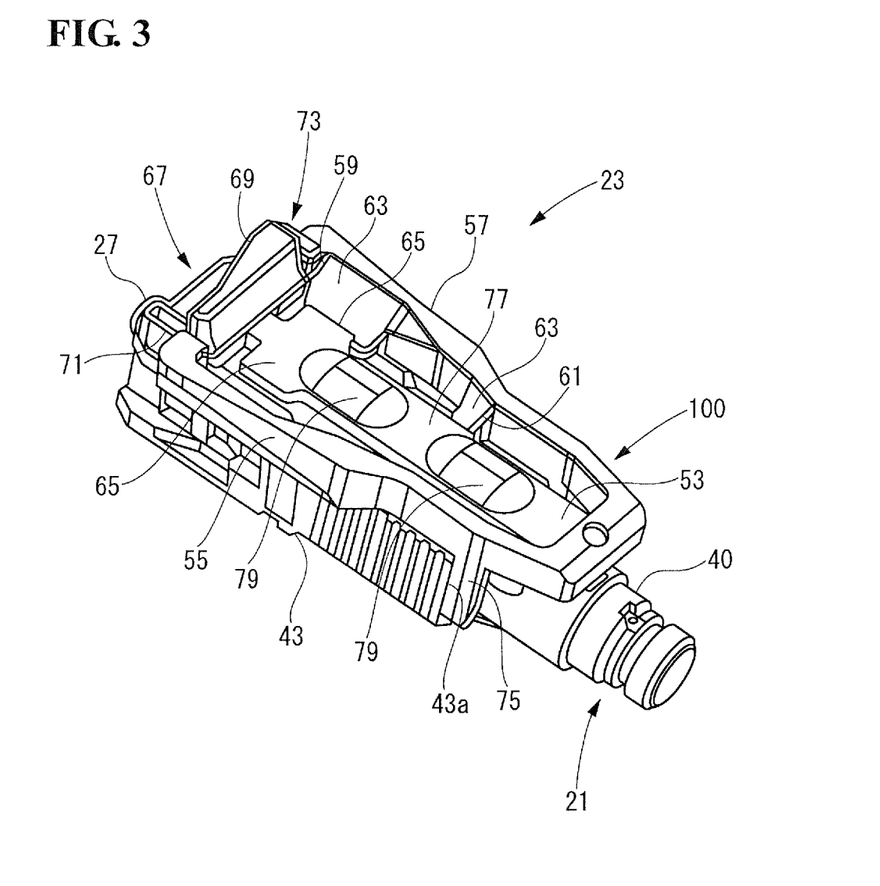
FIG. 3 is a perspective view showing an optical connector with the optical connector construction tool of FIG. 1 mounted thereon in a state where the construction tool is locked.

Upright bars 75, 75 are provided substantially perpendicularly in the vicinity of the proximal ends of the arms 55, 57. The upright bars 75, 75 engage with the optical connector 21, and the optical connector construction tool 100 is positioned facing the optical connector 21. FIG. 3 is a perspective view showing an optical connector 21 with the optical connector construction tool 100 mounted thereon in a state where the construction tool is locked. The optical connector construction tool 100 is mounted on a top surface of the optical connector 21, forming an optical connector 23 provided with a construction tool. When the optical connector construction tool 100 is mounted on the optical connector 21, the wedge 51 is inserted into the mechanical splice part of the optical connector 21, and the upright bars 75, 75 are locked into position on the optical connector 21. The upright bars 75, 75 abut lateral proximal end surfaces 43a, 43a of the handling case 43, facing more forward than rearward.

The upright bars 75, 75 also function as a pivotally supporting portion 83 (refer to FIG. 5) when the wedge supporting plate 53 deflects upward. When the arms 55, 57 are brought together, and the protrusions 59, 61 are inserted into the bottom surface 49 of the wedge supporting plate 53; i.e., between the wedge supporting plate 53 and the optical connector 21, the front part of the optical connector construction tool 100 rotates upward with the upright bars 75, 75 acting as the pivotally supporting portion. Even when the wedge 51 remains partially in place without being fully removed, the wedge 51 can be readily withdrawn by having the rotating proceed in the same direction, with the upright bars 75, 75 being used as the supporting portion, and the arms 55, 57 being brought towards each other.

Figure 6:
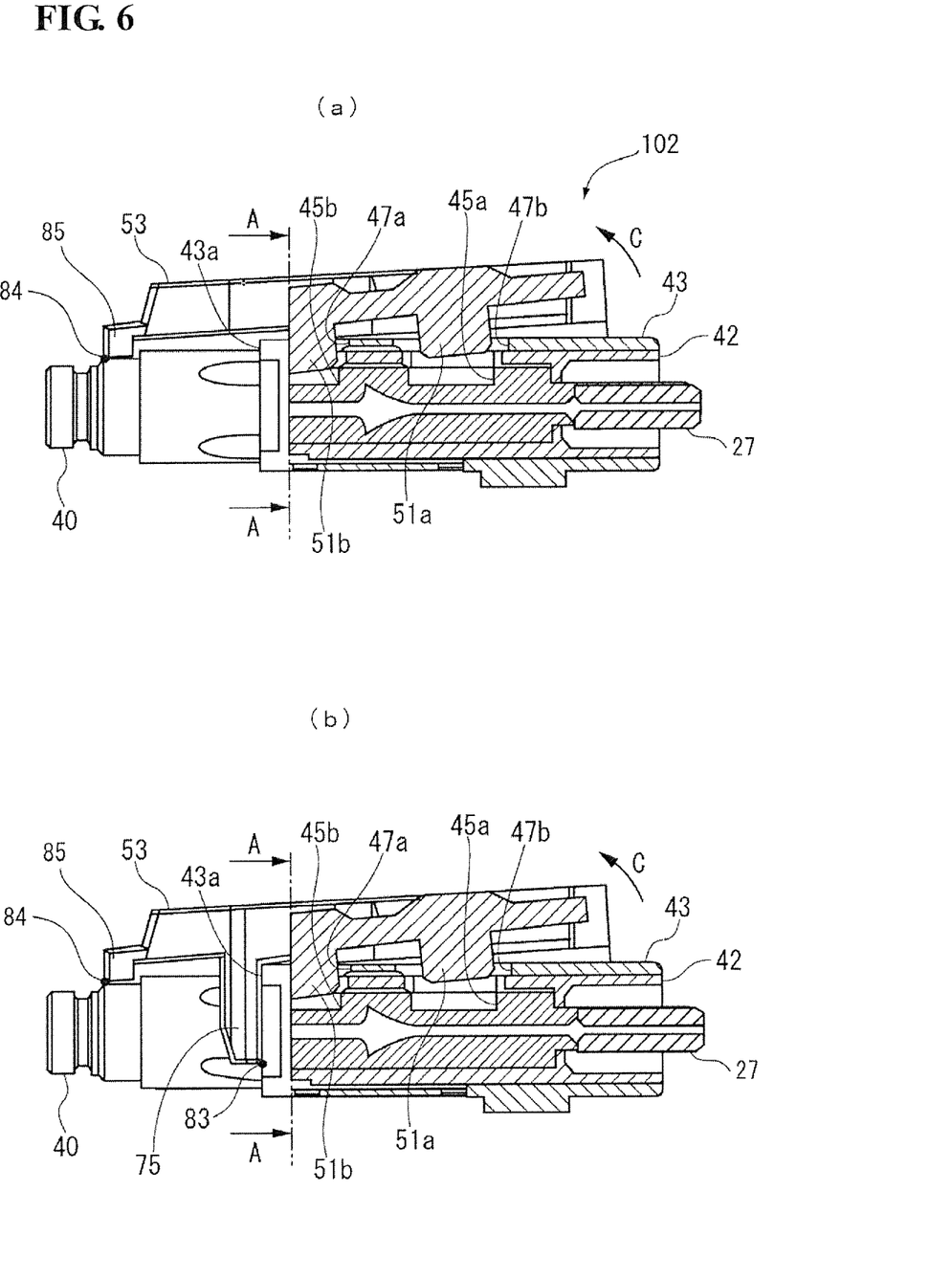
In FIGS. 6, (a) and (b) are partially cutaway vertical cross-sectional views showing an optical connector with an optical connector construction tool of a modified example of the invention mounted on the optical connector in a state where the wedge is being withdrawn.

Instead of having the upright bars 75 provided to the optical connector construction tool 100, the rear end of the wedge supporting plate 53 may be elongated. In FIG. 6, (a) shows a partially cutaway vertical cross-sectional view of the optical connector 21, on which is mounted an optical connector construction tool 102 that is a modified embodiment of the connector construction tool 100, during withdrawal of the wedge. The connector construction tool 102 comprises a protrusion trailing part 85 instead of the upright bar 75, and a proximal end of the protrusion trailing part 85 functions as a pivotally supporting portion 84. The connector construction tool 102 may also comprise the upright bar 75 and the protrusion trailing part 85 ((b) in FIG. 6).

In the optical connector construction tool 100, at least the wedge 51 and the wedge supporting plate 53 are constructed of a creep-resistant transparent resin, e.g., polyetherimide (PEI), polysulfone (PSU), or polycarbonate (PC). This allows the wedge 51 and the wedge supporting plate 53 to undergo minimal deformation over time, such that narrowing of the insertion space for an optical fiber in the mechanical splice part due to deformation of the inserted wedge can be prevented and the insertion of the optical fiber to be attached to the connector will never be impossible.

Visible light that escapes from the region where the optical fibers are connected is guided via the transparent wedge 51a to a top surface 77 of the wedge supporting plate 53, and can be seen. It is thereby possible to make a visual confirmation that the operation of connecting the optical fibers has been successfully performed.

The top surface 77 of the wedge supporting plate 53 on which the wedge 51 is positioned constitutes convex portions 79, 79 having a convex lens shape. In particular, the top surface 77 of the wedge supporting plate 53 on which the front side wedge 51a is positioned is a convex portion 79 having a convex lens shape, enabling the light escaping from the connecting portion and introduced into the distal end of the wedge to be more visible, and making it possible to confirm with greater reliability whether the operation of connecting the optical fibers has been successful, based on flashing escaped light.

A mechanical splice method using the optical connector construction tool 100 will now be described. In order to keep the mechanical splice part from deforming over time, an optical connector in which a mechanical splice is employed is usually supplied as an optical connector 23 provided with a construction tool on which a connector construction tool 100 is mounted (FIG. 3). The optical connector construction tool 100 is mounted on the optical connector in a manner in which the front side wedge 51a and the rear side wedge 51b are inserted into the front wedge insertion hole 45a and the rear wedge insertion hole 45b via the slotted holes 47a, 47b provided to the handling case 43 of the optical connector 21.

FIG. 4 is a cross-sectional view of a main part of the optical connector 21 with respect to a plane perpendicular to an optical fiber, wherein (a) shows the state before the wedge is inserted, and (b) shows the state during insertion of the wedge. When the front side wedge 51a is inserted into the front wedge insertion hole 45a, the V-grooved base plate 29 and the pressing lid 39 are separated. This results in a state in which the glass fiber 35 can be inserted into the optical fiber anchoring groove 33a, and the fiber provided with a sheath 37 can be inserted into the rear sheathed-fiber anchoring groove 33b. The fiber provided with a sheath 37 which is removed at the distal end of the fiber to expose the glass fiber 35 is inserted from the fiber insertion guide part 81 of the rear end part of the optical connector 21 (FIG. 7).

A refractive-index-matching material is, e.g., applied to the distal end of the glass fiber 35, and thereby disposed in the region which is shown by B in FIG. 7 and where the glass fiber 35 and the short fiber 25 are connected. Escaping light passes through the front side wedge 51*a*, the wedge supporting plate 53, and the convex portion 79; and is confirmed to be flashing visible light until the glass fiber 35 and the short fiber 25 are successfully connected. If the connection is successful, light will no longer escape from the glass fiber 35. In this state, the locking protrusion 73*a* of the locking portion 67 is unlocked from the locking concave part 73*b*, the locking piece 69 is placed on the side opposite the arm 57, and the arms 55, 57 can be brought into proximity with each other.

Figure 5:
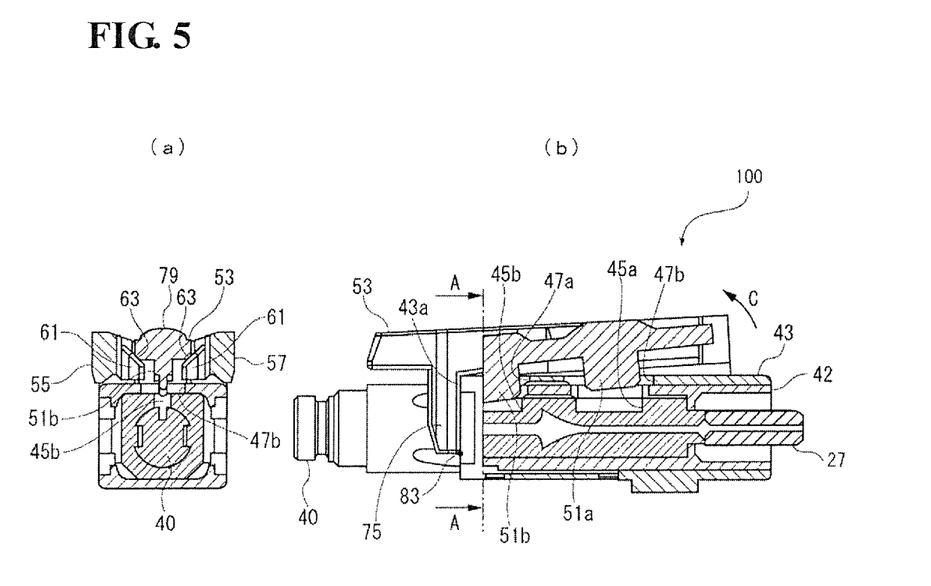
FIG. 5 shows an optical connector provided with a construction tool when the wedge is being withdrawn, wherein (a) is a cross-sectional view along cut plane A-A, and (b) is a partially cutaway vertical cross-sectional view.

FIG. 5 shows an optical connector provided with a construction tool when the wedge is being withdrawn, wherein (a) is a cross-sectional view along cut plane A-A, and (b) is a partially cutaway vertical cross-sectional view. Area (c) in FIG. 4 is a cross-sectional view of a main part of the optical connector 23 with respect to a plane perpendicular to the optical fiber, after the wedge has been withdrawn. If the visible light seen from the convex portion 79 disappears and the connection can be confirmed as being successful, the arms 55, 57 are manually brought together. When the arms 55, 57 are brought into proximity with each other, the protrusions 59, 61 of the arms 55, 57 move to the bottom surface 49 of the wedge supporting plate 53, and the bottom surface 49 of the wedge supporting plate 53 is pressed upward by the moved protrusions 59, 61, so that the wedge supporting plate 53 deflects upward. The wedge supporting plate 53 and the wedge 51 are thereby moved upward.

In the mechanical splice using the optical connector construction tool 100, as described above, first the front side wedge 51*a* and then rear side wedge 51*b* are withdrawn in turn. The fiber provided with a sheath 37 is thereby anchored once the optical fibers 25, have been anchored together. Therefore, anchoring is performed in a desirable sequence in which no stress remains inside the mechanical splice. In addition, even when the wedge 51 is not fully removed and remains partially in place, the wedge 51 can be readily withdrawn by having the rotating proceed in the direction of arrow C (FIG. 5), with the site where the upright bars 75, 75 connect with the side-part proximal end surfaces 43*a*, 43*a* being used as the supporting portion, and the arms 55, 57 being brought towards each other. According to the optical connector construction tool 100, the wedge withdrawal operation is thus carried out using a simple, compact, unitary structure broadly divided into a wedge supporting plate 53 and a pair of arms 55, 57. In addition, the deforming regions are the readily flexing cantilever beam-shaped arms 55, 57; therefore, the material need not be dependent on deformation characteristics.

Accordingly, the optical connector construction tool 100 can be formed as a single component that is both compact and simple in structure. As a result, the wedge-withdrawing operation can be more reliably performed, and manufacturing costs can be reduced.

The optical connector construction tool according to the present invention is used for a connector in which a mechanical splice assembled on site is employed.

What is claimed is:

1. An optical connector construction tool comprising:
    a base plate;
    a wedge provided to a bottom surface of the base plate, the wedge being inserted into a mechanical splicing part of an optical connector;
    a pair of arms extending from both side parts of the base plate, the arms having proximal ends for contacting both side parts;
    a pair of protrusions, each of the protrusions projecting from a corresponding one of the arms toward the base plate, the protrusions engaging the bottom surface of the base plate and deflecting the base plate upward in response to the pair of arms being pressed toward one another; and
    a locking portion directly connected to a first of the pair of arms via a hinge and is movable between a locked position in which the locking portion is anchored to a second of the pair of arms and an unlocked position in which the locking portion is not anchored to the second of the pair of arms such that in the locked position the locking portion restricts movement of the pair of arms and in the unlocked position movement of the pair of arms is not restricted by the locking portion,
    the wedge including a rear side wedge and a front side wedge, the rear side wedge being provided on the base plate in a vicinity of the proximal ends of the arms, and the front side wedge being provided on the base plate forward of the vicinity of the proximal ends, the front wedge side of the base plate being deflected upward in advance of the vicinity of the proximal end.

2. The optical connector construction tool according to claim 1, comprising,
    an upright bar in the vicinity of the proximal ends, the upright bar being dimensioned to engage the optical connector for positioning the optical connector construction tool on the optical connector, and for being a pivotally supporting portion around which the base plate deflects upward.

3. The optical connector construction tool according to claim 1, wherein a pivotally supporting portion is located in the vicinity of the proximal ends, the pivotally supporting portion around which being configured such that the base plate deflects upwardly with respect to the optical connector deflects when engaging with the optical connector occurs with the wedge interposed therebetween.

4. The optical connector construction tool according to claim 1, wherein at least the wedge and the base plate are formed from a transparent resin.

5. The optical connector construction tool according to claim 1, wherein the base plate includes a top surface formed in a convex lens shape, the top surface being located in the portion of the base plate in which the wedge is positioned.

6. The optical connector construction tool according to claim 2, wherein at least the wedge and the base plate are formed from a transparent resin.

7. The optical connector construction tool according to claim 3, wherein at least the wedge and the base plate are formed from a transparent resin.

8. The optical connector construction tool according to claim 2, wherein the base plate includes a top surface formed in a convex lens shape, the top surface being located in the portion of the base plate in which the wedge is positioned.

9. The optical connector construction tool according to claim 3, wherein the base plate includes a top surface formed in a convex lens shape, the top surface being located in the portion of the base plate in which the wedge is positioned.

10. The optical connector construction tool according to claim 4, wherein the base plate includes a top surface formed in a convex lens shape, the top surface being located in the portion of the base plate in which the wedge is positioned.

* * * * *